United States Patent
Lee et al.

(10) Patent No.: US 9,231,726 B2
(45) Date of Patent: Jan. 5, 2016

(54) EXTENDING PATH COMPUTATION ELEMENT PROTOCOL TO ACCOMMODATE ROUTING AND WAVELENGTH ASSIGNMENT IN WAVELENGTH SWITCHED OPTICAL NETWORKS

(75) Inventors: Young Lee, Plano, TX (US); Greg Bernstein, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 472 days.

(21) Appl. No.: 13/596,325

(22) Filed: Aug. 28, 2012

(65) Prior Publication Data

US 2012/0321308 A1    Dec. 20, 2012

Related U.S. Application Data (63) Continuation of application No. 12/138,144, filed on Jun. 12, 2008, now Pat. No. 8,290,366.

(60) Provisional application No. 60/974,278, filed on Sep. 21, 2007.

(51) Int. Cl.
  *H04J 14/00* (2006.01)
  *H04J 14/02* (2006.01)
  (Continued)

(52) U.S. Cl.
  CPC ......... *H04J 14/0246* (2013.01); *H04J 14/0257* (2013.01); *H04J 14/0267* (2013.01);
  (Continued)

(58) Field of Classification Search
  CPC .............. H04J 14/0269; H04J 14/0246; H04J 14/0257; H04J 14/0267; H04J 14/0284; H04J 14/0258; H04J 14/0268; H04J 14/0227; H04Q 11/0062; H04Q 2011/0073; H04Q 2011/0086; H04L 45/00; H04L 45/123; H04L 45/62
  USPC ....................................... 398/49, 57
  See application file for complete search history.

(56) References Cited

U.S. PATENT DOCUMENTS 7,209,975 B1 *  4/2007  Zang et al. ..................... 709/238
7,362,974 B2 *  4/2008  De Patre et al. ................ 398/50

(Continued)

FOREIGN PATENT DOCUMENTS

CN    1878047 A    12/2006
WO    2008011770 A1    1/2008

OTHER PUBLICATIONS

Bernstein, G. and Lee, Y., (Editors), "Framework for GMPLS and PCE Control of Wavelength Switched Optical Networks," draft-bernstein-ccamp-wavelength-switched-03.txt, Feb. 19, 2008, 68 pages.

(Continued)

*Primary Examiner* — M. R. Sedighian
(74) *Attorney, Agent, or Firm* — Conley Rose, P.C.; Grant Rodolph; Brandt D. Howell (57) ABSTRACT

A network component comprising at least one processor configured to implement a method comprising transmitting a request to compute a routing assignment, a wavelength assignment, or both for a signal in a wavelength switched optical network, wherein the request comprises a lightpath constraint and wherein the request is transmitted using a path computation element protocol. Also disclosed is a network comprising a first path computation element (PCE) and a path computation client (PCC) in communication with the PCE, wherein the PCC is configured to send a request to and receive a reply from the PCE using a PCE protocol, wherein the request comprises a lightpath constraint. Included is a method comprising sending a discovery advertisement to the at least one PCE that calculates a wavelength assignment, receiving a response comprising a PCE capability information from the PCE, wherein the request and the reply are communicated via a PCE protocol.

14 Claims, 4 Drawing Sheets

(51) Int. Cl.
- H04L 12/701 (2013.01)
- H04L 12/721 (2013.01)
- H04Q 11/00 (2006.01)

(52) U.S. Cl.
CPC ............ H04J14/0269 (2013.01); H04L 45/00 (2013.01); H04L 45/123 (2013.01); H04L 45/62 (2013.01); H04Q 11/0062 (2013.01); H04J 14/0258 (2013.01); H04J 14/0268 (2013.01); H04J 14/0284 (2013.01); H04Q 2011/0073 (2013.01); H04Q 2011/0086 (2013.01)

(56) References Cited

U.S. PATENT DOCUMENTS

| | | | |
|---|---|---|---|
| 7,554,996 | B2 | 6/2009 | Previdi et al. |
| 2003/0020977 | A1 | 1/2003 | Smith et al. |
| 2003/0025957 | A1 | 2/2003 | Jayakumar |
| 2004/0057727 | A1 | 3/2004 | Lim et al. |
| 2004/0208570 | A1 | 10/2004 | Reader |
| 2008/0089346 | A1 | 4/2008 | Lee |

OTHER PUBLICATIONS

Crocker, Ed., et al., "Augmented BNF for Syntax Specifications: ABNF," RFC 2234, Nov. 1997, 16 pages.
Lee, Y., et al., "Path Computation Element Communication Protocol (PCECP) Requirements and Protocol Extensions in Support of Global Concurrent Optimization," draft-ietf-pce-global-concurrent-optimization-00.txt, Jun. 22, 2007, 32 pages.
Lee, Y., et al., "Path Computation Element Communication Protocol (PCE) Requirements and Protocol Extensions in Support of Global Concurrent Optimization," draft-ietf-pce-global-concurrent-optimization-02.txt, Feb. 21, 2008, 31 pages.
Le Roux, J.L., Ed., et al., "OSPF Protocol Extensions for Path Computation Element (PCE) Discovery," RFC 5088, Jan. 2008, 20 pages.
Le Roux, J.L., Ed., et al., "IS-IS Protocol Extensions for Path Computation Element (PCE) Discovery," RFC 5089, Jan. 2008, 17 pages.
Le Roux, J.L., Ed., et al., "OSPF Protocol Extensions for Path Computation Element (PCE) Discovery," draft-ietf-pce-disco-proto-ospf-08.txt, Oct. 2007, 20 pages.
Vasseur, J.P., et al., "Path Computation Element (PCE) Communication Protocol (PCEP)," draft-ieft-pce-pcep-12.txt, Mar. 24, 2008, 77 pages.
Vasseur, J.P., et al., "Path Computation Element (PCE) Communication Protocol (PCEP),"draft-ieft-pce-pcep-08.txt, Jul. 5, 2007, 73 pages.
Farrel, A., "A Path Computation Element (PCE)—Based Architecture," Network Working Group, RFC 4655, Aug. 2006, 35 pages.
Lee, Y., "Path Computation Element Communication Protocol (PCEP) Requirements and Extensions for the Support of Wavelength Switched Optical Networks," Network Working Group, Internet Draft, draft-lee-pce-wson-routing-wavelength-01.txt, Feb. 18, 2008, 19 pages.
Bernstein, Greg, et al., "Extending GMPLS/PCE for Use in Wavelength Switched Optical Networks," OFC/NFOEC 2008, 3 pages.
Ash, J., et al., "Path Computation Element (PCE) Communication Protocol," IETF Network Working Group, RFC 4657, Sep. 2006, 17 pages.

Bradner, S., "Key Words for Use in RFCs to Indicate Requirement Levels," IETF Network Working Group, RFC 2119, BCP 14, Mar. 1997, 3 pages.
Berger, L., "Generalized Multi-Protocol Label Switching (GMPLS) Signaling Functional Description," IETF Network Working Group, RFC 3471, Jan. 2003, 31 pages.
Berger, L., "Generalized Multi-Protocol Label Switching (GMPLS) Signaling Resource Reservation Protocol-Traffic Engineering (RSVP-TE) Extensions," IETF Network Working Group, RFC 3473, Jan. 2003, 38 pages.
Bernstein, G, et al., "Framework for GMPLS and PCE Control of Wavelength Switched Optical Networks," IETF Network Working Group, Internet Draft, draft-bernstein-ccamp-wavelength-switched-01.txt, Sep. 13, 2007, 32 pages.
Le Roux, J.L., et al., OSPF Protocol Extensions for Path Computation Element (PCE) Discovery, IETF Network Working Group, Internet Draft, draft-ietf-pce-disco-proto-ospf-07.txt, Sep. 2007, 21 pages.
Le Roux, J.L., et al., "IS-IS Protocol Extensions for Path Computation Element (PCE) Discovery," IETF Network Working Group, Internet Draft, draft-ietf-pce-disco-proto-isis-08.txt, Oct. 2007, 15 pages.
Le Roux, J.L., et al., "Encoding of Objective Functions in Path Computation Element (PCE) Communication and Discovery Protocols," IETF Network Working Group, Internet Draft, draft-leroux-pce-of-01.txt, Jul. 2007, 19 pages.
Le Roux, J.L., et al., "Encoding of Objective Functions in Path Computation Element Communication Protocol (PCEP)," IETF Network Working Group, Internet Draft, draft-ietf-pce-of-05.txt, Sep. 6, 2008, 16 pages.
Vasseur, J.P., et al., "Path Computation Element (PCE) Communication Protocol (PCEP)—Version 1," IETF Network Working Group, Internet Draft, draft-ietf-pce-pcep-01.txt, Feb. 24, 2006, 55 pages.
Foreign Communication From a Counterpart Application, International Search Report and Written Opinion, PCT/CN2008/072358, Nov. 27, 2008, 15 pages.
Office Action dated Mar. 18, 2011, U.S. Appl. No. 12/138,144, filed Jun. 12, 2008, 15 pages.
Office Action dated Jul. 13, 2011, U.S. Appl. No. 12/138,144, filed Jun. 12, 2008, 10 pages.
Office Action dated Nov. 16, 2011, U.S. Appl. No. 12/138,144, filed Jun. 12, 2008, 15 pages.
Office Action dated Apr. 12, 2012, U.S. Appl. No. 12/138,144, filed Jun. 12, 2008, 11 pages.
Notice of Allowance dated Aug. 16, 2012, U.S. Appl. No. 12/138,144, filed Jun. 12, 2008, 5 pages.
Lee, Y., Ed., et al., Framework for GMPLS and PCE Control of Wavelength Switched Optical Networks (WSON), IETF Network Working Group, Internet Draft, draft-ietf-ccamp-wavelength-switched-framework-00.txt, May 13, 2008, 68 pages.
Koushik, A.S., et al., "PCE Communication Protocol (PCEP) Management Information Base," IETF PCE Working Group, Internet Draft, draft-kkoushik-pce-pcep-mib-00.txt, Aug. 2007, 18 pages.
Koushik, A.S., et al., "PCE Communication Protocol (PCEP) Management Information Base," IETF PCE Working Group, Internet Draft, draft-kkoushik-pce-pcep-mib-01.txt, Jan. 2008, 19 pages.
Berger, "GMPLS Signaling Procedure for Egress Control," RFC 4003, Feb. 2005, 5 pages.

* cited by examiner

EXTENDING PATH COMPUTATION ELEMENT PROTOCOL TO ACCOMMODATE ROUTING AND WAVELENGTH ASSIGNMENT IN WAVELENGTH SWITCHED OPTICAL NETWORKS

CROSS-REFERENCE TO RELATED APPLICATIONS

This application is a continuation of prior U.S. patent application Ser. No. 12/138,144 filed Jun. 12, 2008 by Lee et al. and entitled "Extending Path Computation Element Protocol to Accommodate Routing and Wavelength Assignment in Wavelength Switched Optical Networks", which claims priority to U.S. Provisional Patent Application No. 60/974,278 filed Sep. 21, 2007 by Lee et al. and entitled "Method for Extending PCEP to Accommodate Routing and Wavelength Assignment in Wavelength Switched Optical Networks", both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bidirectional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks.

One of the challenges in implementing WDM networks is the determination of the routing and wavelength assignment (RWA) for the various signals that are being transported through the network at any given time. Unlike traditional circuit-switched and connection-oriented packet-switched networks that merely have to determine a route for the data stream across the network, WDM networks are burdened with the additional constraint of having to ensure that the same wavelength is not simultaneously used by two signals over a single fiber. This constraint is compounded by the fact that WDM networks typically use specific optical bands comprising a finite number of usable optical wavelengths. As such, the RWA continues to be one of the challenges in implementing WDM technology in optical networks.

SUMMARY

In one embodiment, the disclosure includes a network component comprising at least one processor configured to implement a method comprising transmitting a request to compute a routing assignment, a wavelength assignment, or both for a signal in a WSON, wherein the request comprises a lightpath constraint, and wherein the request is transmitted using a path computation element protocol.

In another embodiment, the disclosure includes a network comprising a path computation element (PCE) and a path computation client (PCC) in communication with the PCE, wherein the PCC is configured to send a request to and receive a reply from the PCE using a PCE protocol, wherein the request comprises a lightpath constraint.

In yet another embodiment, the disclosure includes a method comprising sending a discovery advertisement to the at least one PCE that calculates a wavelength assignment, receiving a reply comprising a PCE capability information from the PCE, wherein the request and the reply are communicated via a PCE protocol.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for extending path computation element protocol (PCEP) to accommodate RWA in WDM networks, such as the WSON. Specifically, a PCC may send a request to a PCE using PCE protocol (PCEP). The request may include various types of lightpath constraints, such as a RWA computation option, a route parameter, a wavelength selection preference, an optimization degree, a timeliness characteristic, a duration, or combinations thereof. The lightpath constraints may be used in the computation of the RWA, and the RWA may be returned to the PCC using a PCEP reply.

Figure 1:
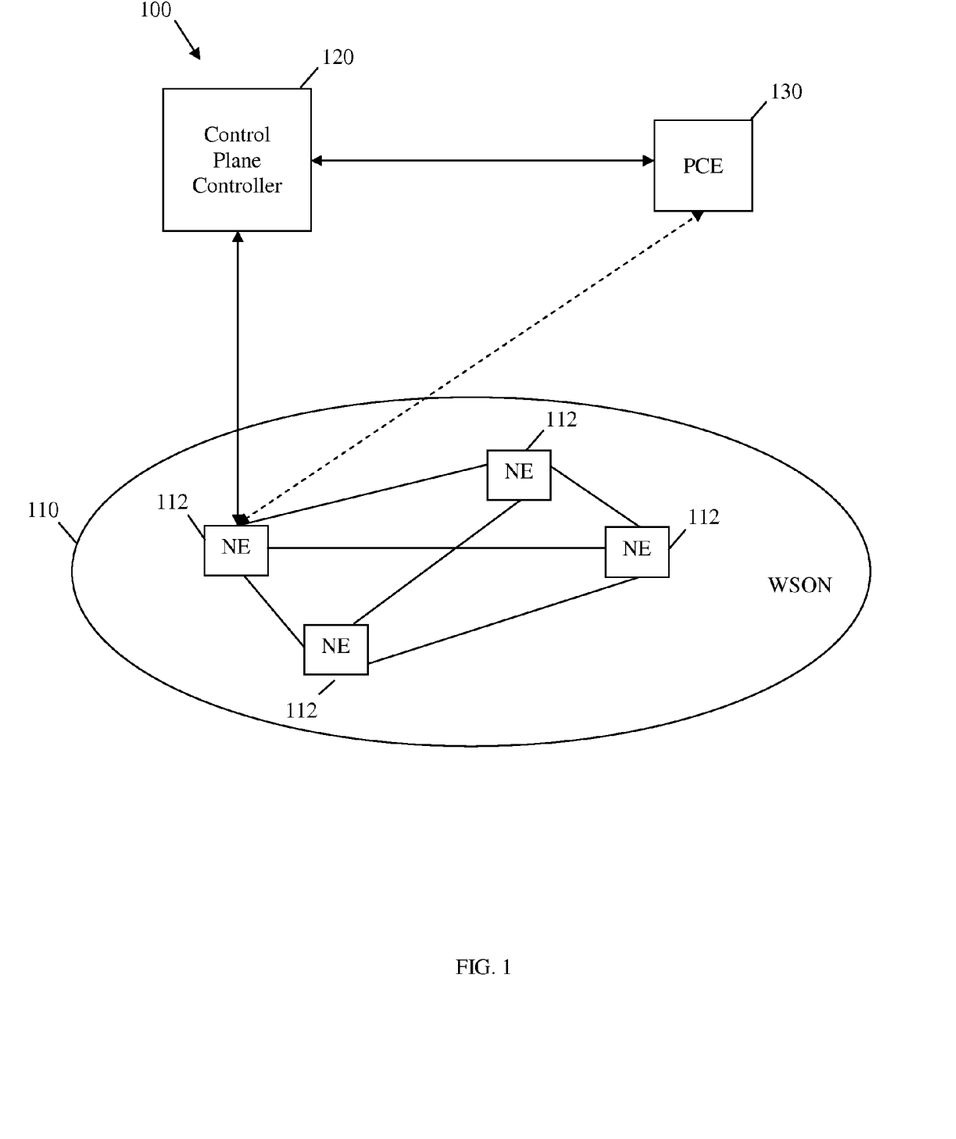
FIG. 1 is a schematic diagram of an embodiment of a WSON system.

FIG. 1 illustrates one embodiment of a WSON system 100. The system 100 may comprise a WSON 110, a control plane controller 120, and a PCE 130. The WSON 110, control plane controller 120, and PCE 130 may communicate with each other via optical, electrical, or wireless means. The WSON 110 may comprise a plurality of NEs 112 coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any number of NEs 112.

The WSON 110 may be any optical network that uses active or passive components to transport optical signals. The WSON 110 may implement WDM to transport the optical signals through the WSON 110, and may comprise various optical components as described in detail below. The WSON 110 may be part of a long haul network, a metropolitan network, or a residential access network.

The NEs 112 may be any devices or components that transport signals through the WSON 110. In an embodiment, the NEs 112 consist essentially of optical processing components, such as line ports, add ports, drop ports, transmitters, receivers, amplifiers, optical taps, and so forth, and do not contain any electrical processing components. Alternatively, the NEs 112 may comprise a combination of optical processing components and electrical processing components. At least some of the NEs 112 may be configured with wavelength converters, optical-electrical (OE) converters, electrical-optical (EO) converters, OEO converters, or combinations thereof. However, it may be advantageous for at least some of the NEs 112 to lack such converters as such may reduce the cost and complexity of the WSON 110. In specific embodiments, the NEs 112 may comprise optical cross connects (OXCs), photonic cross connects (PXCs), type I or type II reconfigurable optical add/drop multiplexers (ROADMs), wavelength selective switches (WSSs), fixed optical add/drop multiplexers (FOADMs), or combinations thereof.

The NEs 112 may be coupled to each other via optical fibers. The optical fibers may be used to establish optical links and transport the optical signals between the NEs 112. The optical fibers may comprise standard single mode fibers (SMFs) as defined in ITU-T standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference.

The control plane controller 120 may coordinate activities within the WSON 110. Specifically, the control plane controller 120 may receive optical connection requests and provide lightpath signaling to the WSON 110 via an Interior Gateway Protocol (IGP) such as Generalized Multi-Protocol Label Switching (GMPLS), thereby coordinating the NEs 112 such that data signals are routed through the WSON 110 with little or no contention. In addition, the control plane controller 120 may communicate with the PCE 130 using PCEP, provide the PCE 130 with information that may be used for the RWA, receive the RWA from the PCE 130, and/or forward the RWA to the NEs 112. The control plane controller 120 may be located in a component outside of the WSON 110, such as an external server, or may be located in a component within the WSON 110, such as a NE 112.

The PCE 130 may perform all or part of the RWA for the WSON system 100. Specifically, the PCE 130 may receive the wavelength or other information that may be used for the RWA from the control plane controller 120, from the NEs 112, or both. The PCE 130 may process the information to obtain the RWA, for example, by computing the routes, e.g. lightpaths, for the optical signals, specifying the optical wavelengths that are used for each lightpath, and determining the NEs 112 along the lightpath at which the optical signal should be converted to an electrical signal or a different wavelength. The RWA may include at least one route for each incoming signal and at least one wavelength associated with each route. The PCE 130 may then send all or part of the RWA information to the control plane controller 120 or directly to the NEs 112. To assist the PCE 130 in this process, the PCE 130 may comprise a global traffic-engineering database (TED), a RWA information database, an optical performance monitor (OPM), a physical layer constraint (PLC) information database, or combinations thereof. The PCE 130 may be located in a component outside of the WSON 110, such as an external server, or may be located in a component within the WSON 110, such as a NE 112.

In some embodiments, the RWA information may be sent to the PCE 130 by a path computation client (PCC). The PCC may be any client application requesting a path computation to be performed by the PCE 130. The PCC may also be any network component that makes such a request, such as the control plane controller 120, or any NE 112, such as a ROADM or a FOADM.

Figure 2:
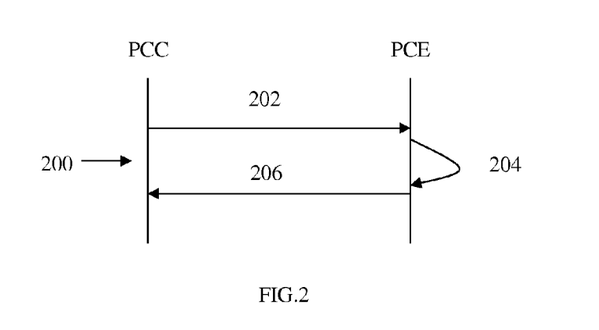
FIG. 2 is a protocol diagram of an embodiment of the communications between a PCE and a PCC.

FIG. 2 illustrates an embodiment of a path computation communication method 200 between the PCC and the PCE. The method 200 may be implemented using any suitable protocol, such as the PCEP. In the method 200, the PCC may send a path computation request 202 to the PCE. The request may include any of the lightpath constraints disclosed below. At 204, the PCE calculates a path through the network that meets the lightpath constraints. For example, the PCE may calculate the RWA. The PCE may then send a path computation reply 206 to the PCC. The reply 206 may comprise the RWA or one of the other reply options described below.

When a network comprises a plurality of PCEs, not all PCEs within the network may have the ability to calculate the RWA. Therefore, the network may comprise a discovery mechanism that allows the PCC to determine the PCE in which to send the request 202. For example, the discovery mechanism may comprise an advertisement from a PCC for a RWA-capable PCE, and a response from the PCEs indicating whether they are RWA-capable. The discovery mechanism may be implemented as part of the method 200 or as a separate process.

Figure 3:
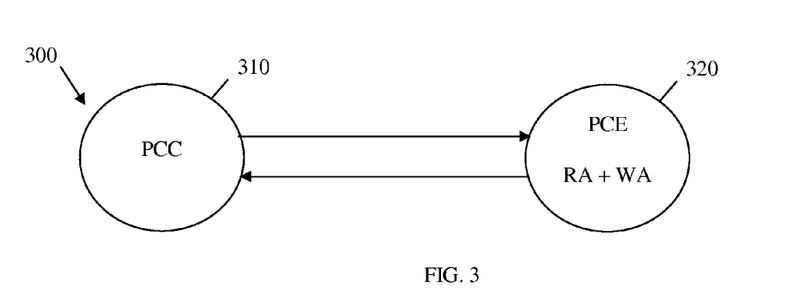
FIG. 3 is a schematic diagram of an embodiment of a PCE architecture.

The PCE may be embodied in one of several architectures. FIG. 3 illustrates an embodiment of a combined RWA architecture 300. In the combined RWA architecture 300, the PCC 310 communicates the RWA request and the required information to the PCE 320, which implements both the routing assignment and the wavelength assignment functions using a single computation entity, such as a processor. For example, the processor may process the RWA information using a single or multiple algorithms to compute the lightpaths as well as to assign the optical wavelengths for each lightpath. The amount of RWA information needed by the PCE 320 to compute the RWA may vary depending on the algorithm used. If desired, the PCE 320 may not compute the RWA until sufficient network links are established between the NEs or when sufficient RWA information about the NEs and the network topology is provided. The combined RWA architecture 300 may be preferable for network optimization, smaller WSONs, or both.

Figure 4:
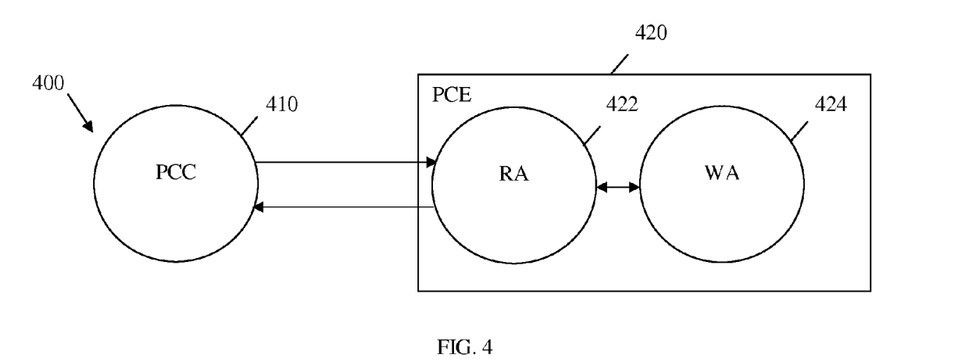
FIG. 4 is a schematic diagram of another embodiment of the PCE architecture.

FIG. 4 illustrates an embodiment of a separated RWA architecture 400. In the separated RWA architecture 400, the PCC 410 communicates the RWA request and the required information to the PCE 420, which implements both the routing function and the wavelength assignment function using separate computation entities, such as processors 422 and 424. Alternatively, the separated RWA architecture 400 may comprise two separate PCEs 420 each comprising one of the processors 422 and 424. Implementing routing assignment and wavelength assignment separately may offload some of the computational burden on the processors 422 and 424 and reduce the processing time. In an embodiment, the PCC 410 may be aware of the presence of only one of two processors 422, 424 (or two PCEs) and may only communicate with that processor 422, 424 (or PCE). For example, the PCC 410 may send the RWA information to the processor 422, which may compute the lightpath routes and forward the routing assignment to the processor 424 where the wavelength assignments are performed. The RWA may then be passed back to the processor 422 and then to the PCC 410. Such an embodiment may also be reversed such that the PCC 410 communicates with the processor 424 instead of the processor 422.

In either architecture 300 or 400, the PCC may receive a route from the source to destination along with the wavelengths, e.g. GMPLS generalized labels, to be used along portions of the path. The GMPLS signaling supports an explicit route object (ERO). Within an ERO, an ERO label sub-object can be used to indicate the wavelength to be used at a particular NE. In cases where the local label map approach is used, the label sub-object entry in the ERO may have to be translated.

Figure 5:
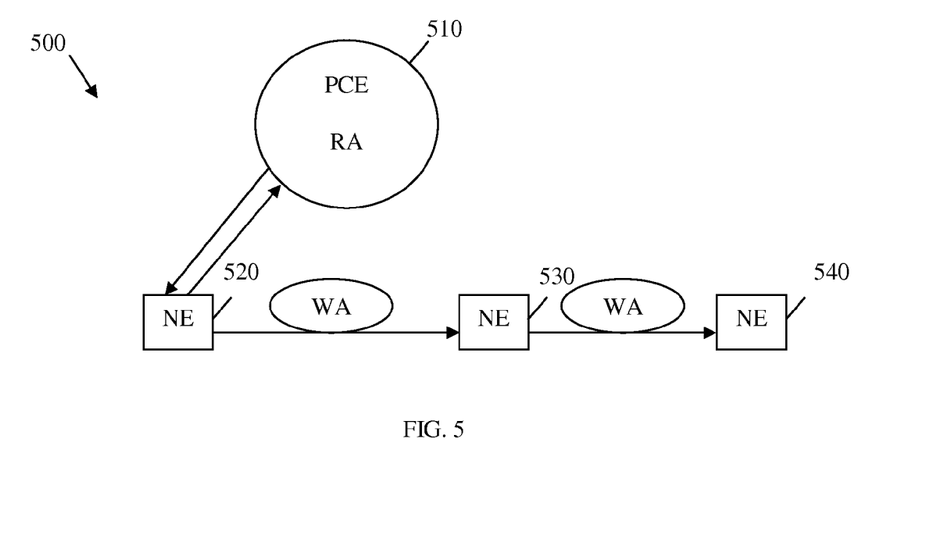
FIG. 5 is a schematic diagram of another embodiment of the PCE architecture.

FIG. 5 illustrates a distributed wavelength assignment architecture 500. In the distributed wavelength assignment architecture 500, the PCE 510 may receive some or all of the RWA information from the NEs 520, 530, and 540, perhaps via direct link, and implements the routing assignment. The PCE 510 then directly or indirectly passes the routing assignment to the individual NEs 520, 530, and 540, which assign the wavelengths at the local links between the NEs 520, 530, and 540 based on local information. Specifically, the NE 520 may receive local RWA information from the NEs 530 and 540 and send some or all of the RWA information to the PCE 510. The PCE 510 may compute the lightpaths using the received RWA information and send the list of lightpaths to the NE 520. The NE 520 may use the list of lightpaths to identify the NE 530 as the next NE in the lightpath. The NE 520 may establish a link to the NE 530 and use the received local RWA information that may comprise additional constraints to assign a wavelength for transmission over the link. The NE 530 may receive the list of lightpaths from the NE 520, use the list of lightpaths to identify the NE 540 as the next NE in the lightpath, establish a link to the NE 540, and assign the same or a different wavelength for transmission over the link. Thus, the signals may be routed and the wavelengths may be assigned in a distributed manner between the remaining NEs in the network. Assigning the wavelengths at the individual NEs may reduce the amount of RWA information that has to be sent to the PCE 510.

As mentioned above, the request may comprise at least one lightpath constraint. The lightpath constraint may be any parameter that affects or limits the use of wavelengths along the lightpaths within the network. In an embodiment, the lightpath constraints may include a RWA computation option. The RWA computation option may specify the portions of the RWA that needs to be solved or otherwise considered. Suitable RWA computation options include routing assignment, wavelength assignment, routing and wavelength assignment, and routing assignment with a suggested or restricted wavelength set. Routing assignment may indicate that the NE desires the routing assignment, but not the wavelength assignment. Alternatively, routing assignment may indicate that the routing assignment is separated from the wavelength assignment, as indicated in FIG. 4 above. In either case, the request may comprise the wavelength assignment. Wavelength assignment may indicate that the NE desires the routing assignment, but not the wavelength assignment. Alternatively, wavelength assignment may indicate that the wavelength assignment is separated from the routing assignment, as indicated in FIG. 4 above. In either case, the request may comprise the routing assignment. Routing and wavelength assignment may indicate that the NE desires both the routing assignment and the wavelength assignment or a more optimal RWA. Finally, routing assignment with a suggested or restricted wavelength set may indicate that the NE desires the routing assignment and a suggested or restricted set of wavelengths such as candidate wavelengths from which the NE may select the wavelengths to assign to the lightpath(s). Alternatively, routing assignment with a suggested or restricted wavelength set may indicate that the wavelength assignment is distributed, as indicated in FIG. 5 above.

In a specific embodiment, the RWA computation option may be included in a request parameter (RP) object in the request. For example, the RWA computation option may be embodied as a RWA Computation (RC) flag located in the flags field of the RP object. In an embodiment, the RC flag may be defined as indicated in Table 1 below.

TABLE 1

| Bit | Description |
| --- | --- |
| 00 | Routing Assignment |
| 01 | Wavelength Assignment |
| 10 | Routing Assignment with Suggested or Restricted Wavelength Set |
| 11 | Routing and Wavelength Assignment |

In an embodiment, the lightpath constraints may include a route parameter. The route parameter may indicate a limitation in the assignment of wavelengths to the lightpath. Suitable route parameter options include bidirectional assignment of wavelengths, simultaneous assignment of wavelengths to a primary lightpath and a backup lightpath, and optical transmitter tuning range constraints. Bidirectional assignment of wavelengths may indicate that a single wavelength should be assigned to a lightpath and used for two-way communications or that separate wavelengths should be assigned to each direction of the lightpath. Simultaneous assignment of wavelengths to a primary lightpath and a backup lightpath may indicate that the same wavelength should be assigned to the primary lightpath and the backup lightpath. Alternatively, simultaneous assignment of wavelengths to a primary lightpath and a backup lightpath may indicate that separate wavelengths should be assigned to the primary lightpath and the backup lightpath. The optical transmitter tuning range constraint may indicate the wavelengths at which any optical transmitters along the lightpath can transmit.

Figure 6:
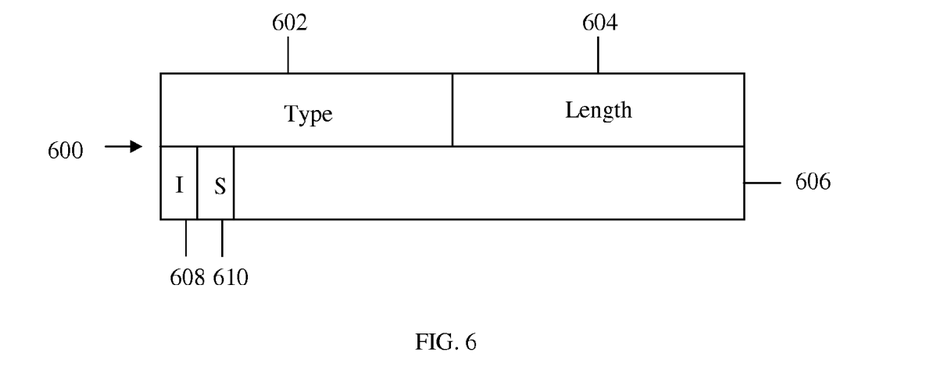
FIG. 6 is a schematic diagram of an embodiment of a lightpath route parameter type length value (TLV).

In a specific embodiment, the route parameter may be included in a RP object in the request. For example, when the RC flag described above indicates wavelength assignment, an optional route parameter TLV may be included in the RP object. FIG. 6 illustrates one embodiment of a suitable route parameter TLV 600. The TLV 600 may include a type field 602, a length field 604, and a value field 606. The type field 602 may comprise the first about 16 bits of the TLV 600, and may indicate that the TLV 600 is a route parameter TLV. The length field 604 may be the subsequent about 16 bits of the TLV 600, and may indicate the length of the value field 606. The value field 606 may be any size, but in some embodiments is the subsequent about 32 bits on the TLV 600 and may indicate the route parameter. In some instances, the value field 606 may comprise one or more flags, such as an I flag 608 and an S flag 610. The I flag 608 may be about 1 bit in length, and may indicate the directionality of the wavelength assignment. For example, the TLV 600 may indicate a bidirectional assignment of wavelengths when the I flag is set to zero, and the TLV 600 may indicate a unidirectional assignment of wavelengths when the I flag is set to one. Similarly, the S flag 610 may be about 1 bit in length, and may indicate the commonality of the wavelength assignment. For example, the TLV 600 may indicate an assignment of the same wavelength to the primary and backup lightpaths when the S flag is set to zero, and the TLV 600 may indicate an assignment of different wavelengths to a primary path and a backup path when the S flag is set to one.

In an embodiment, the lightpath constraints may include a wavelength selection preference. The wavelength selection preference may indicate the criteria by which the wavelength assignment is assigned to the lightpath. Suitable wavelength selection preference options include random, first fit, most used, least loaded, and no preference. Random may indicate that the wavelength should be randomly chosen from a group of suitable wavelengths. First fit may indicate that the wavelength should be the first suitable wavelength that is found. Most used may indicate that the selected wavelength should be the most commonly used wavelength within the group of all suitable wavelengths. Least loaded may indicate that the selected wavelength should be the least commonly used wavelength within the group of all suitable wavelengths. Finally, no preference may indicate that the PCC does not care or has no opinion as to the selected wavelength assignment.

Figure 7:
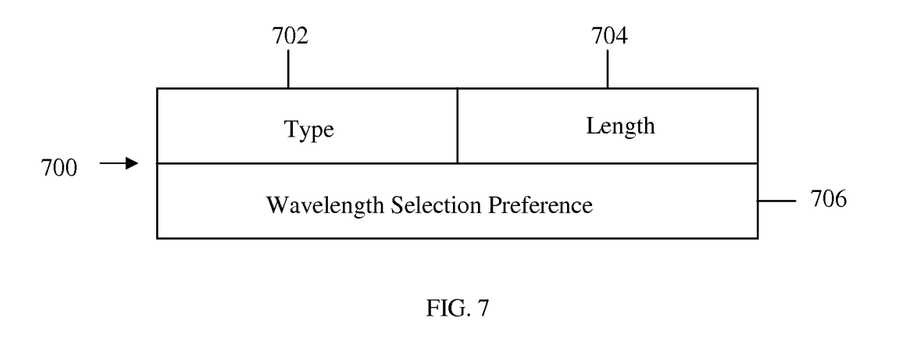
FIG. 7 is a schematic diagram of an embodiment of a wavelength selection preference TLV.

In a specific embodiment, the wavelength selection preference may be included in the RP object in the request. For example, when the RC flag in the RP object described above indicates wavelength assignment, an optional wavelength selection preference TLV may be included in the RP object. FIG. 7 illustrates one embodiment of a suitable wavelength selection preference TLV 700. The TLV 700 may include a type field 702, a length field 704, and a value field 706. The type field 702 may comprise the first about 16 bits of the TLV 700, and may indicate that the TLV 700 is a wavelength selection TLV. The length field 704 may be the subsequent about 16 bits of the TLV 700, and may indicate the length of the value field 706. The value field 706 may be any size, but in some embodiments is the subsequent about 32 bits of the TLV 700 and may indicate the wavelength selection preference as indicated in Table 2 below.

TABLE 2

| Function Code | Wavelength Selection Preference |
|---|---|
| 1 | Random |
| 2 | First Fit |
| 3 | Most Used |
| 4 | Least Loaded |
| 5 | No Preference |

In an embodiment, the lightpath constraints may include an optimization degree. The optimization degree may indicate the number of lightpaths that are included in a single RWA calculation. Suitable optimization degree options include concurrent optimization, simultaneous request of a primary lightpath and a backup lightpath, or sequential optimization. Concurrent optimization may indicate that multiple lightpaths are contained in a single request. Simultaneous request of a primary lightpath and a backup lightpath may indicate that two lightpaths are requested: a primary lightpath that is intended to carry the signal, and a backup lightpath that can carry the signal if the primary lightpath fails. The primary and the backup lightpaths may have completely different routes, some common portions of their routes, or the same route. Similarly, the primary and the backup lightpaths may use completely different wavelengths, some common wavelengths if the network comprises at least one converter, or the same wavelength. While the primary and backup lightpaths may share some or all of their routing and wavelength assignment, the primary and backup lightpaths generally do not have the exact same routing and wavelength assignment. If desired, the request may indicate whether the primary and backup lightpaths are to share routing assignment, wavelength assignment, or both, as well as the extent of such. Sequential optimization may indicate that a single lightpath is contained in the request.

In an embodiment, the lightpath constraints may include a timeliness characteristic. The timeliness characteristic may indicate the importance of timeliness to the request or how quickly the RWA should be calculated. Suitable optimization degree options include time critical, soft time bounds, and scheduled. Time critical may indicate that timeliness is important to the request, and may typically be used for restoration of network services or for other high-priority real-time service requests. Soft time bounds may indicate that timeliness is of moderate importance to the request. Soft time bound requests should be handled in a responsive manner, but may allow sufficient time for some amount of network optimization. Soft time bounds may typically be used for new or first-time connection requests. Scheduled may indicate that timeliness is not overly important to the request. Scheduled requests may be used for services requested prior to receipt of the signal, and may receive the highest degree of network optimization.

In an embodiment, the lightpath constraints may include a duration. The duration may indicate the length of the time in which the signal will be in service. Suitable duration options include dynamic, pseudo-static, and static. Dynamic may indicate that the signal will last a relatively short amount of time. Pseudo-static may indicate that the signal will last a moderate amount of time. Static may indicate that the signal will last a relatively long time.

After the request comprising the lightpath constraint has been received by the PCE, the PCE may issue a reply back to the PCC. The reply may include the RWA computed subject to the lightpath constraints indicated above. In addition, the reply may include any or all of the lightpath constraints that were contained in the request. If there is no RWA that satisfies the lightpath constraints, the reply may indicate such, for example using a no path indicator. In a specific embodiment, the no path indicator is contained in a no path vector TLV in a no path object in the reply. Specifically, a 0x10 bit flag may be set in the no path vector TLV to indicate that no route, wavelength, or both was found that satisfied the lightpath constraints in the request. Additionally or alternatively, the reply may indicate which parts of the RWA could not be obtained. For example, the reply may indicate that a suitable route could not be found, a suitable wavelength could not be found, or a suitable combination of a route and a wavelength could not be found. Finally, the reply may include a suggestion for relaxing the lightpath constraints to obtain the RWA. For example, if the RWA would have been obtainable but for the presence of one lightpath constraint, e.g. duration, then the reply may indicate such.

In an embodiment, the reply may contain at least one message. For example, if the PCE is not configured to calculate a RWA, then the reply may contain an error message that the PCE is not configured to calculate the RWA. Such an error message may contain a PCEP error object and an error-value, such as error-type=15 and the error-value=1. Alternatively, if the request is not compliant with administrative privileges, then the reply may contain an error message that indicates that the request is not compliant with administrative privileges. Such an error message may contain a PCEP-error object and an error-value, such as the error-type=6 and the error-value=3. Further in the alternative, if the request or the RWA violates some policy within the PCE or the WSON, then the reply may contain an error message that indicates the policy violation. Such an error message may contain a PCEP error object, such as error-type=6. In any event, the request may be cancelled, and a new request may have to be sent to the PCE.

Figure 8:
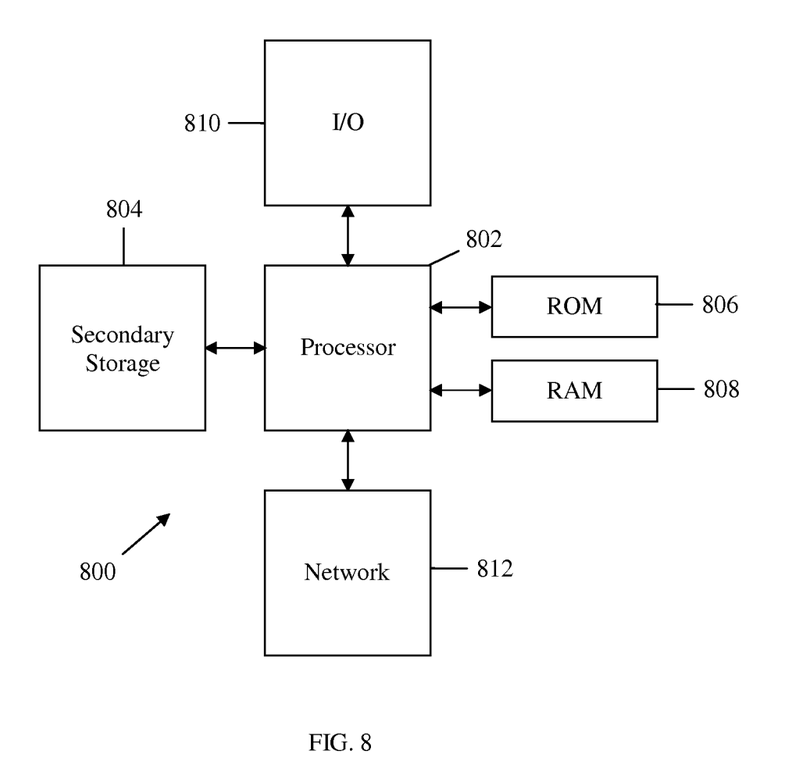
FIG. 8 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage. The RAM 808 is used to store volatile data and perhaps to store instructions. Access to both ROM 806 and RAM 808 is typically faster than to secondary storage 804.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component, comprising:
a path computation element (PCE) in communication with a path computation client (PCC),
wherein the PCE is configured to receive a request from and send a reply to the PCC using PCE communication protocol (PCEP), and
wherein the request comprises:
a lightpath constraint that indicates limits on wavelength usage along a lightpath; and
a wavelength policy constraint that specifies an operator's policy information for wavelength assignment,
wherein the reply comprises a no path indicator that indicates that no lightpath was found.

2. The network component of claim 1, wherein the wavelength policy constraint comprises a random assignment wavelength selection preference.

3. The network component of claim 1, wherein the wavelength policy constraint comprises a most used wavelength selection preference.

4. The network component of claim 1, wherein the wavelength policy constraint comprises a least used wavelength selection preference.

5. A network component, comprising:
a path computation element (PCE) in communication with a path computation client (PCC),
wherein the PCE is configured to receive a request from and send a reply to the PCC using PCE communication protocol (PCEP),
wherein the request comprises:
a lightpath constraint that indicates limits on wavelength usage along a lightpath; and
a wavelength policy constraint that specifies an operator's policy information for wavelength assignment, and
wherein the reply comprises an error message that indicates the PCE is not configured to calculate routing assignment and wavelength assignment.

6. A network component, comprising:
a path computation element (PCE) in communication with a path computation client (PCC),
wherein the PCE is configured to receive a request from and send a reply to the PCC using PCE communication protocol (PCEP), wherein the request comprises:
  a lightpath constraint that indicates limits on wavelength usage along a lightpath; and
  a wavelength policy constraint that specifies an operator's policy information for wavelength assignment, and
wherein the reply comprises an error message that indicates that the request is not compliant with administrative privileges.

7. A network component, comprising:
a path computation element (PCE) in communication with a path computation client (PCC),
wherein the PCE is configured to receive a request from and send a reply to the PCC using PCE communication protocol (PCEP),
wherein the request comprises:
  a lightpath constraint that indicates limits on wavelength usage along a lightpath; and
  a wavelength policy constraint that specifies an operator's policy information for wavelength assignment, and
wherein the reply comprises an error message that indicates that an internal policy of the PCE has been violated.

8. A method implemented in a network component comprising a path computation element (PCE), the method comprising:
communicating with a path computation client (PCC);
receiving a request from the PCC using PCE communication protocol (PCEP), wherein the request comprises a lightpath constraint that indicates limits on wavelength usage along a lightpath and a wavelength policy constraint that specifies an operator's policy information for wavelength assignment; and
sending a reply to the PCC using PCEP,
wherein the reply comprises a no path indicator that indicates that no lightpath was found.

9. The method of claim 8, wherein the reply further comprises an error message that indicates the PCE is not configured to calculate routing assignment and wavelength assignment.

10. The method of claim 8, wherein the reply further comprises an error message that indicates that the request is not compliant with administrative privileges.

11. The method of claim 8, wherein the reply further comprises an error message that indicates that an internal policy of the PCE has been violated.

12. The method of claim 8, wherein the wavelength policy constraint comprises a random assignment wavelength selection preference.

13. The method of claim 8, wherein the wavelength policy constraint comprises a most used wavelength selection preference.

14. The method of claim 8, wherein the wavelength policy constraint comprises a least used wavelength selection preference.

* * * * *